Nov. 13, 1928.

G. F. HITCHCOCK 1,691,391

AIR RELEASE VALVE

Original Filed April 16, 1926      2 Sheets-Sheet 1

Inventor
Guy F. Hitchcock

By Hardway & Cather
Attorneys

Nov. 13, 1928.  G. F. HITCHCOCK  1,691,391

AIR RELEASE VALVE

Original Filed April 16, 1926  2 Sheets-Sheet 2

Inventor
Guy F. Hitchcock

By Hardway Cathey
Attorneys

Patented Nov. 13, 1928.

1,691,391

UNITED STATES PATENT OFFICE.

GUY F. HITCHCOCK, OF HOUSTON, TEXAS, ASSIGNOR, BY DIRECT AND MESNE ASSIGNMENTS, OF ONE-THIRD TO JOE L. TOMLINSON AND ONE-THIRD TO THOMAS H. MEEKS, BOTH OF HARRIS COUNTY, TEXAS.

AIR-RELEASE VALVE.

REISSUED

Application filed April 16, 1926, Serial No. 102,373. Renewed August 27, 1928.

This invention relates to new and useful improvements in an air release valve.

One object of the invention is to provide a novel type of release valve, adapted to be applied directly to an air pressure reservoir, or to the extension pipe, leading therefrom, forming part of the air brake system of railway trains, and whereby the air pressure may be easily relieved from said reservoir.

Another object of the invention is to provide an air release valve of the character described which is of very simple construction, and may be easily operated and readily applied.

With the above and other objects in view this invention has particular relation to certain novel features of construction, operation and arrangement of parts, an example of which is given in this specification and illustrated in the accompanying drawings, wherein:—

Figure 1:
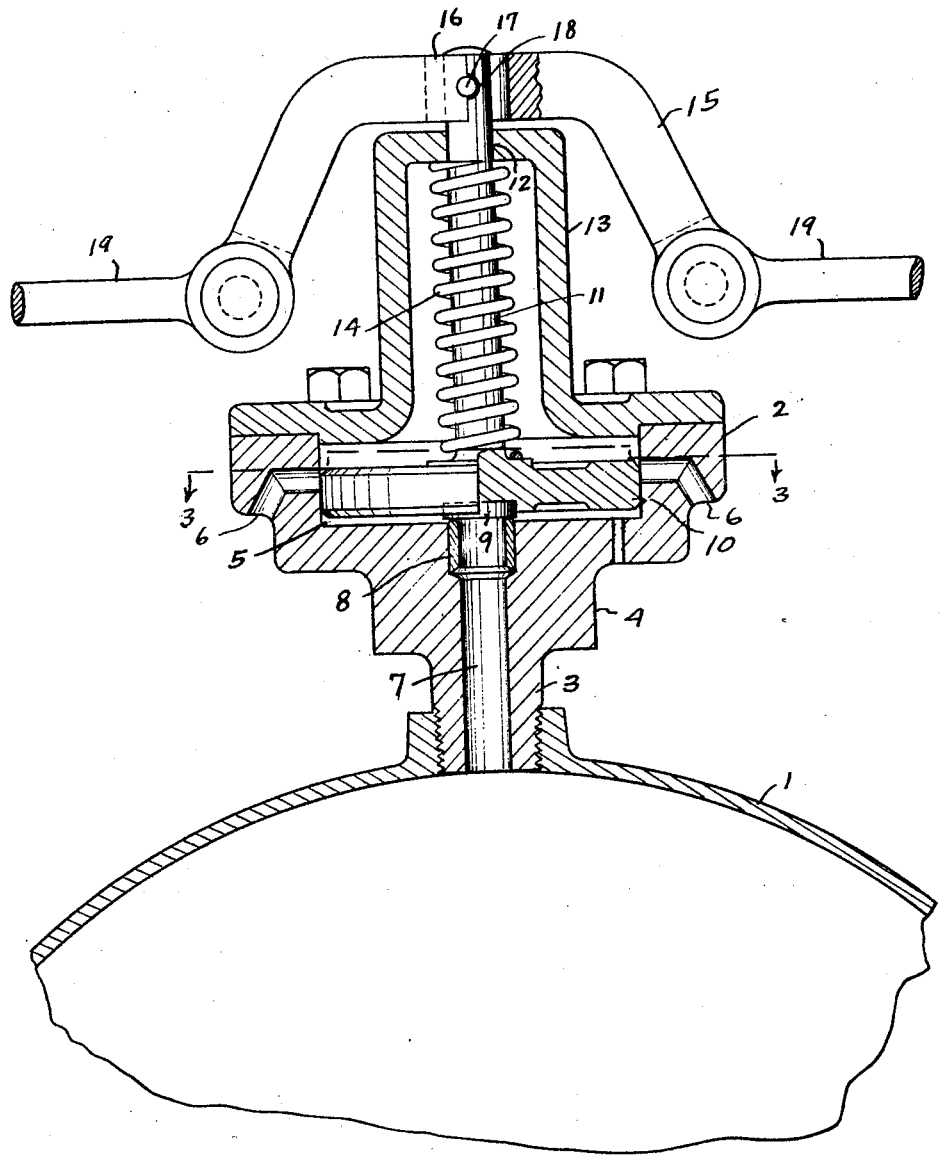
Figure 1 shows a vertical sectional view of the valve as applied to an air pressure reservoir.
Figure 2:
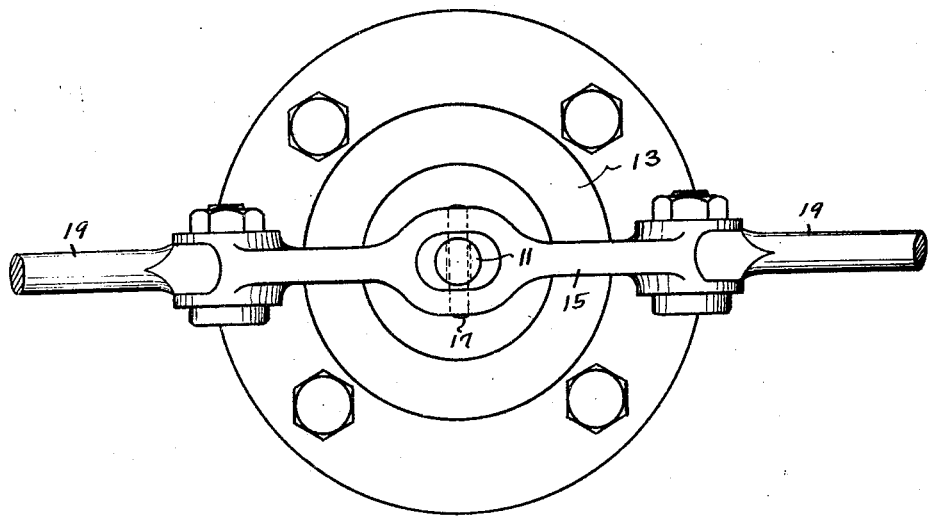
Figure 2 shows a plan view.
Figure 3:
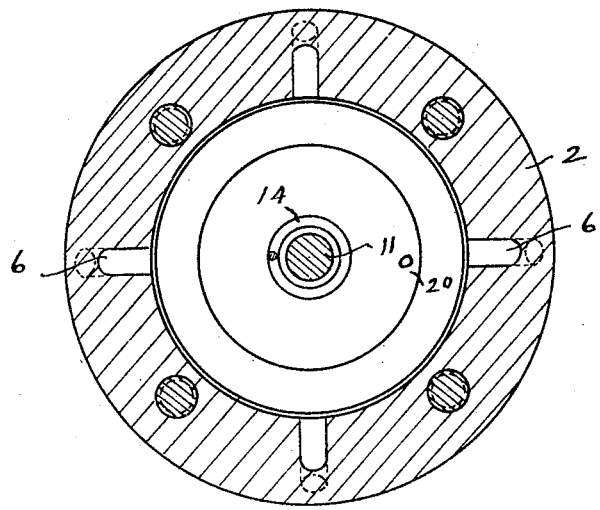
Figure 3 shows a cross sectional view, taken on the line 3—3 of Figure 1.

Referring now more particularly to the drawings, wherein like numerals of reference designate similar parts in each of the figures the numeral 1 designates the air pressure reservoir. There is a valve body 2 whose lower end 3 is reduced and outwardly threaded and thus adapted to be screwed into a tapped hole in the reservoir, or in an air line connected therewith. Above the reduced end 3 the body is of square or hexagonal shape, as at 4, to receive a wrench for securing the valve into place.

The upper part of the valve body is formed into a cylinder 5, having the lateral relief ports 6. An air relief conduit 7 leads up through the body 2 from the interior of the reservoir and terminates in the cylinder 6. Driven into the upper end of the relief conduit 7 there is a tubular valve seat 8 whose upper end is formed with a knife edge and a valve 9 co-operates with said seat to normally close the relief conduit.

This valve is carried by the under side of the plunger 10 which works in the cylinder 5. Fastened to the plunger 10 there is an upstanding stem 11, which works through a central bearing 12 in the cap 13. This cap is bolted onto the body 2 and encloses a coil spring 14 which surrounds the stem 11 and is interposed between the cap and plunger and normally holds the valve 9 in closed position, also holding the plunger 10 in position to close the ports 6.

There is a substantially arcuate yoke 15 having a central bearing 16 to receive the upper end of the stem 11 and provided with a cross pin 17, which works loosely in a cross bearing 18 in the upper end of the stem 11.

The operating rods 19, 19, are hinged at their inner ends to the respective ends of the yoke 15 and the outer ends of the rods are accessible under the respective sides of the car beneath which the reservoir 1 is located.

Normally the air pressure in the reservoir will not be sufficient to lift the valve 9 and plunger 10, on account of the small area of the valve 9 against which the pressure may operate. In order to relieve the pressure in the reservoir 1 either rod 19 may be pulled outwardly which will operate to elevate the corresponding end of the yoke 15, said yoke operating on the top of the cap 13, as a fulcrum, and the plunger 10 is thereby slightly lifted to admit air into the cylinder 5 and on account of the large area of the plunger against which the air, under pressure, may now operate, the plunger will be lifted, by said pressure, to uncover the ports 6 and the pressure in the reservoir will be immediately reduced to such a point that the air brake cylinder will automatically release the remaining pressure. Thereupon the spring 14 will force the plunger 10 downwardly and seat the valve 9, forcing the air in the cylinder out through the small relief port 20 in the bottom of the cylinder. This relief port also prevents the accumulation of air in the cylinder, which might leak past the valve 9, and prematurely lift the plunger 10, and release the air pressure from the reservoir 1.

What I claim is:

1. A valve including a valve body, formed with a cylinder having a relief conduit entering the cylinder and a relief port leading therefrom, a plunger in the cylinder normally closing said port, a valve carried by the plunger normally closing said conduit, means normally holding said plunger and valve in closed position and a manually operable yoke pivotally connected to the outer end of the plunger whereby the same may be lifted to open said conduit and port.

2. A valve including a valve body formed with a cylinder having an air inlet conduit and a relief port, a plunger in the cylinder arranged to normally block said conduit and port, a yieldable member operating against the plunger and normally holding the same seated and a yoke upon the outer end of the plunger for lifting the plunger to open said conduit and port.

3. A valve including a valve body formed with a cylinder and having a pressure relief conduit entering the cylinder and a pressure relief port leading from said cylinder, a bearing member fastened on said body having a bearing, a plunger in the cylinder adapted to close said port, a valve carried by the plunger adapted to close said conduit, a stem connected to the cylinder and working through said bearing, a yieldable member interposed between said bearing member and plunger, a yoke above the cap and having a pivotal connection with said stem and operating rods pivoted to the respective ends of said yoke.

4. A valve including a valve body formed with a cylinder having an air relief conduit entering the cylinder and a plurality of air relief ports leading from the cylinder, a plunger in said cylinder normally blocking said relief ports, said plunger being formed with a vlave which normally closes said relief conduit, a cap on said body formed with a bearing, a stem carried by the plunger working through said bearing, a yieldable member operating against the plunger and normally holding the same in position to close said relief ports and said relief conduit, and a yoke pivoted to the stem through which the plunger may be lifted to open said conduit and ports.

5. A valve including a valve body formed with a cylinder and having an air inlet conduit, a valve seat in the end of said conduit which terminates in the cylinder, said cylinder also having relief ports, a plunger in said cylinder normally blocking said relief ports, a valve carried by the plunger adapted to cooperate with said seat, a cap secured to said body and formed with a bearing, a stem carried by the plunger and working through said bearing, a yieldable member interposed between said cap and plunger, a yoke having a pivotal connection with the outer end of said stem and operating rods hinged to the respective ends of the yoke.

6. A valve mechanism including a body formed with a cylinder and having a pressure relief conduit and an air relief port, a plunger in the cylinder normally blocking said port and formed with a valve which normally blocks said conduit, a bearing member secured to said body and having a bearing, a stem carried by the plunger and working through said bearing, a yoke pivotally connected to the outer end of said stem, an operating rod pivotally connected to each end of the yoke, and a yieldable member acting against the plunger and normally holding the same in position to block said port.

7. A valve mechanism including a body formed with a cylinder and having a pressure relief conduit and an air relief port, a plunger in the cylinder normally blocking said port and formed with a valve which normally blocks said conduit, a cap secured to said body and having a bearing, a stem carried by the plunger and working through said bearing, a yoke pivotally connected to the outer end of said stem, operating means connected to each end of the yoke and a yieldable member acting against the plunger normally holding the same in position to block said port.

8. A valve mechanism including a body formed with a cylinder having a pressure relief conduit entering the cylinder and air relief ports leading from the cylinder, a plunger in the cylinder normally blocking one of said ports and having a valve which normally blocks said conduit, means for manually moving said plunger into one position to open the port normally blocked by it, and to simultaneously open said conduit and yieldable means through which the plunger may be moved in the other direction to close the port controlled by the plunger, the other port being at all times open.

In testimony whereof I have signed my name to this specification.

GUY F. HITCHCOCK.